United States Patent [19]
Califano et al.

[11] Patent Number: 6,041,133
[45] Date of Patent: *Mar. 21, 2000

[54] METHOD AND APPARATUS FOR FINGERPRINT MATCHING USING TRANSFORMATION PARAMETER CLUSTERING BASED ON LOCAL FEATURE CORRESPONDENCES

[75] Inventors: Andrea Califano, New York, N.Y.; Scott Eric Colville, Madison, Wis.; Robert Steven Germain, Tuckahoe, N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/764,949

[22] Filed: Dec. 13, 1996

[51] Int. Cl.⁷ .............................. G06K 9/00; G06K 9/48; G06K 9/62

[52] U.S. Cl. .......................... 382/124; 382/125; 382/199; 382/209

[58] Field of Search .................................. 382/115, 124, 382/125, 204, 190, 201, 195, 209, 260, 173; 283/77; 340/146.3

[56] References Cited

U.S. PATENT DOCUMENTS

| | | | |
|---|---|---|---|
| 4,151,512 | 4/1979 | Riganati et al. | 340/146.3 |
| 4,310,827 | 1/1982 | Asai | 340/146.3 |
| 4,817,183 | 3/1989 | Sparrow | 382/124 |
| 5,073,962 | 12/1991 | Califano | 382/205 |
| 5,140,642 | 8/1992 | Hsu et al. | 382/124 |
| 5,351,310 | 9/1994 | Califano et al. | 382/199 |

OTHER PUBLICATIONS

"Constraint Satisfaction Networks for Vision", R. Mohan, Research Report 90A004190.

"Active 3D Object Models", R.M. Bolle et al., Research Report 92A002727.

"Use of Correlated Information for Feature Recognition", A. Califano, Research Report (RC 14116).

"Visual Recognition Using Concurrent and Layered Parameter Networks", R.M. Bolle, Research Report 89A000797.

"Systematic Design of Indexing Strategies for Object Recognition", A. Califano et al., 1993 IEEE, p. 709.

"FLASH: A Fast Look–Up Algorithm for String Homology", A. Califano et al., 1993 IEEE, p. 853.

"Multidimensional Indexing for Recognizing Visual Shapes", A. Califano et al., 1994 IEEE, pp. 373–392.

*Primary Examiner*—Jose L. Couso
*Assistant Examiner*—Duy M. Dang
*Attorney, Agent, or Firm*—Jay P. Sbrollini

[57] ABSTRACT

The method and apparatus of the present invention provide for automatic recognition of fingerprint images. In an acquisition mode, subsets of the feature points for a given fingerprint image are generated in a deterministic fashion. One or more of the subsets of feature points for the given fingerprint image is selected. For each selected subset, a key is generated that characterizes the fingerprint in the vicinity of the selected subset. A multi-map entry corresponding to the selected subset of feature points is stored and labeled with the corresponding key. In the recognition mode, a query fingerprint image is supplied to the system. The processing of the acquisition mode is repeated in order to generate a plurality of keys associated with a plurality of subsets of feature points of the query fingerprint image. For each key generated in the recognition mode, all entries in the multi-map that are associated with this key are retrieved. For each item retrieved, a hypothesized match between the query fingerprint image and the reference fingerprint image is constructed. Hypothesized matches are accumulated in a vote table. This list of hypotheses and scores stored in the vote table are preferably used to determine whether a match to the query fingerprint image is stored by the system.

46 Claims, 13 Drawing Sheets

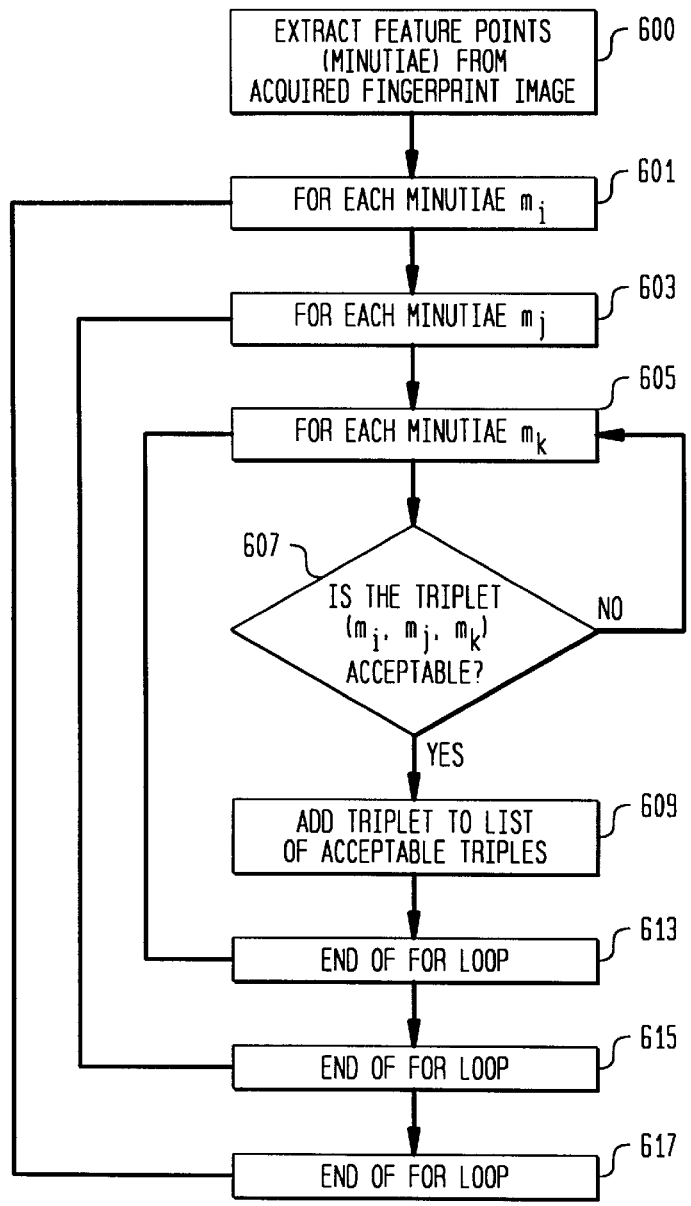
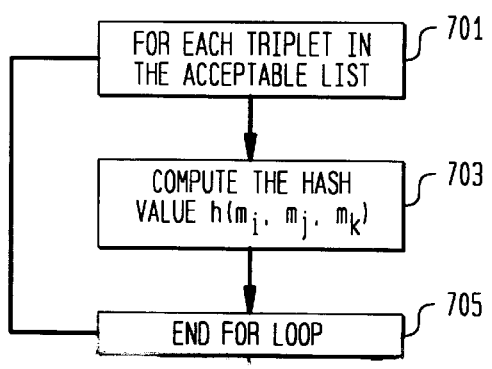

FIG. 12

VOTE TABLE

KEY:
<φ,P>
SCORE

KEY:
<S,P>
SCORE

KEY:
<Ω,R>
SCORE

KEY:
<Y,S>
SCORE

METHOD AND APPARATUS FOR FINGERPRINT MATCHING USING TRANSFORMATION PARAMETER CLUSTERING BASED ON LOCAL FEATURE CORRESPONDENCES

BACKGROUND OF THE INVENTION

1. Technical Field

The invention relates generally to image processing systems, and, more particularly, to image processing systems for identification and verification of images of fingerprints.

2. Description of the Related Art

There are two classes of problems which are addressed by the present invention. The first class of problems involves situations where it is necessary to verify or authenticate an individual's identity. That is a person appears claiming a particular identity or attempting to access information which should only be released to a particular individual. It is important to be able to have some reliable means of verifying this individual's identity or at least confirming that this is the same person who initially registered with the system.

The second, more challenging problem occurs when it is important to ensure that a particular database contains only a single entry for any given individual. This occurs in the case of social services wherein one wishes to prevent individuals from collecting welfare under multiple aliases or in the case of identity card issuance. This identification problem requires that one be able to search a large database of individuals and determine whether this person is already the database. In the case where the database contains millions of individuals, this search is very challenging.

Much of the existing art in this area requires a linear search of the entire database. Using this approach, a full search of a database containing one million entries might require a comparison of the query individual's fingerprint(s) against each entry in the database, thus involving a million or more comparisons. In order to address this problem, much of the existing art uses filtering methods to classify fingerprints and individuals. For example, the database may be segmented by sex, race, approximate age, and fingerprint class. This effectively reduces the size of the database to be searched and consequently the amount of work that must be performed. However, any error in the initial classification leads to a missed identification.

Thus, there is a need in the art to provide for an improved, cost effective and efficient system for matching fingerprints stored in large databases.

SUMMARY OF THE INVENTION

The above-stated problems and related problems of the prior art are solved with the principles of the present invention, method and apparatus for fingerprint matching using transformation parameter clustering based on local feature correspondences. The method and apparatus of the present invention conceptually may be partitioned into two distinct modes: an acquisition mode and a recognition mode.

In the acquisition mode, for one or more fingerprint images, subsets (triplets) of the feature points for a given fingerprint image are generated in a deterministic fashion. One or more of the subsets (triplets) of feature points for the given fingerprint image is selected. For each selected subset (triplet), data is generated that characterizes the fingerprint in the vicinity of the selected subset (triplet). The data corresponding to the selected subset (triplet) is used to form a key (or index). The key is used to store and retrieve entries from a multi-map, which is a form of associative memory which permits more than one entry stored in the memory to be associated with the same key. An entry is generated that preferably contains an identifier that identifies the fingerprint image which generated this key and information (or pointers to such information) concerning the subset (triplet) of feature points which generated this key. The entry labeled by this key is then stored in the multi-map.

In the recognition mode, a query fingerprint image is supplied to the system. Similar to the acquisition mode, subsets (triplets) of feature points of the query fingerprint image are generated in a deterministic fashion. One or more of the subsets (triplets) of the feature points of the query fingerprint image is selected. For each selected subset (triplet), data is generated that characterizes the query fingerprint in the vicinity of the selected subset (triplet). The data corresponding to the selected subset is used to form a key. All entries in the multi-map that are associated with this key are retrieved. As described above, the entries includes an identifier that identifies the referenced fingerprint image. For each item retrieved, a hypothesized match between the query fingerprint image and the reference fingerprint image is constructed. This hypothesized match is labeled by the identifier of the reference fingerprint image and optionally, parameters of the coordinate transformation which bring the subset (triplet) of features in the query fingerprint image into closest correspondence with the subset (triplet) of features in the reference fingerprint image. Hypothesized matches are accumulated in a vote table. The vote table is an associative memory keyed by the reference fingerprint image identifier and the transformation parameters (if used). The vote table stores a score associated with the corresponding reference fingerprint image identifier and transformation parameters (if used). When a newly retrieved item generates a hypothesis that already exists in the associative memory, the score corresponding to the retrieved item is updated, for example by incrementing the score by one. Finally, all the hypotheses stored in the vote table are sorted by their scores. This list of hypotheses and scores is preferably used to determine whether a match to the query fingerprint image is stored by the system.

BRIEF DESCRIPTION OF THE DRAWINGS

FIG. 6 is a flow chart illustrating an example of the selection of subsets (triplets) of feature points and associated filtering according to the present invention;

FIG. 7 is a flow chart illustrating an example of the generation of a data value corresponding to a selected subset (triplet) of feature points according to the present invention;

FIG. 12 is a pictorial illustration of a vote table used in the recognition mode of FIGS. 11(A) and (B).

DETAILED DESCRIPTION OF THE PRESENT INVENTION

A method and apparatus for fingerprint matching using transformation parameter clustering based on local feature correspondences is set forth herein.

Figure 1A:
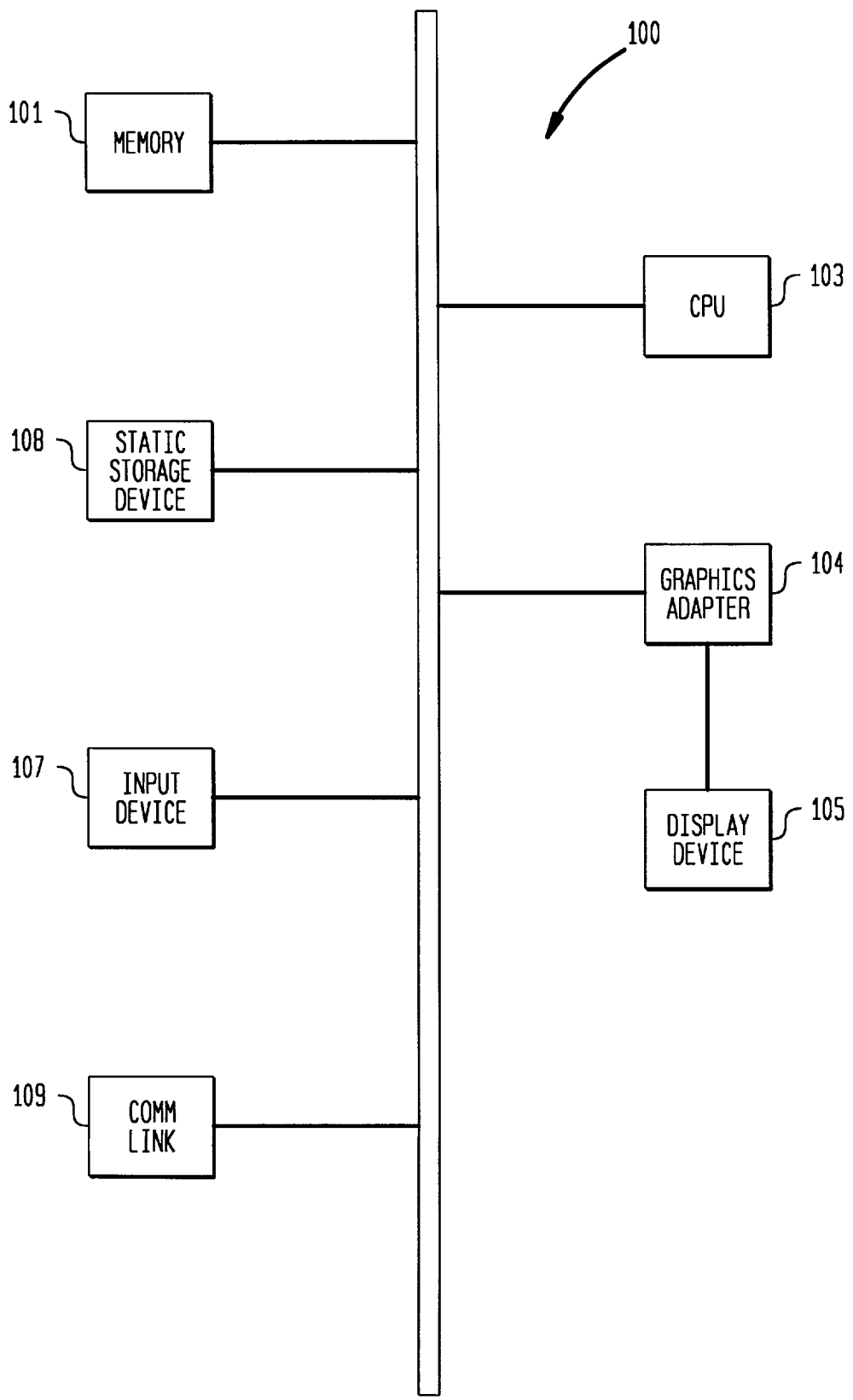
FIG. 1(A) is a functional block diagram of a computer processing system that may be utilized by the preferred embodiment of the present invention.

The present invention may be implemented on any computer processing system including, for example, a personal computer or a workstation. As shown in FIG. 1, a computer processing system 100 as may be utilized by the present invention generally comprises memory 101, at least one central processing unit (CPU) 103 (one shown), and at least one user input device 107 (such as a keyboard, mouse, joystick, voice recognition system, or handwriting recognition system). In addition, the computer processing system includes a nonvolatile memory, such as (ROM), and/or other nonvolatile storage devices 108, such as a fixed disk drive, that stores an operating system and one or more application programs that are loaded into the memory 101 and executed by the CPU 103. In the execution of the operating system and application program(s), the CPU may use data stored in the nonvolatile storage device 108 and/or memory 101. In addition, the computer processing system includes a graphics adapter 104 coupled between the CPU 103 and a display device 105 such as a CRT display or LCD display. In addition, the computer processing system may include a communication link 109 (such as a network adapter, RF link, or modem) coupled to the CPU 103 that allows the CPU 103 to communicate with other computer processing systems over the communication link, for example over the Internet. The CPU 103 may receive portions of the operating system, portions of the application program(s), or portions of the data used by the CPU 103 in executing the operating system and application program(s).

It should be noted that the application program(s) executed by the CPU 103 may perform the methods of the present invention described below. Alternatively, portions or all of the methods described below may be embodied in hardware that works in conjunction with the application program executed by the CPU 103.

Figure 1B:
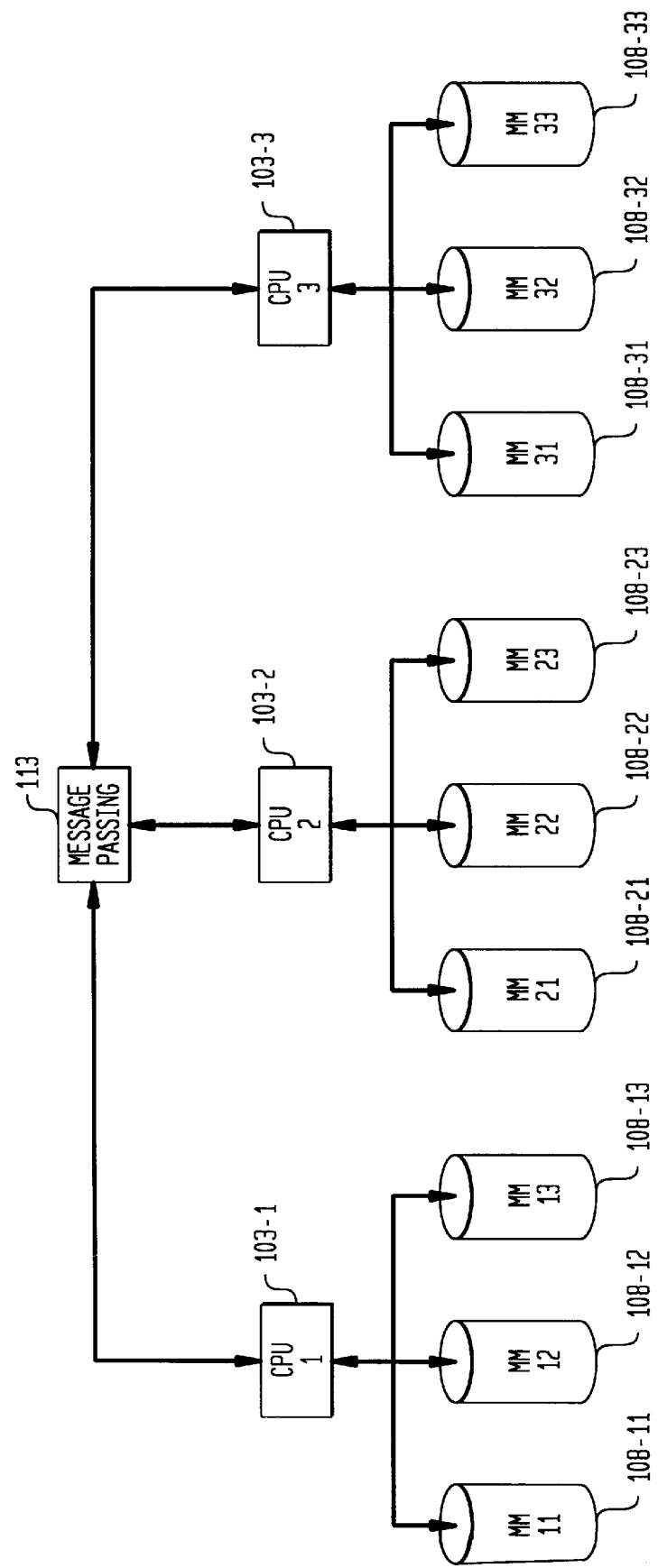
FIG. 1(B) is a pictorial illustration o a distributed computer processing system that may be utilized to perform the recognition mode of the present invention.

In addition, the computer processing system 100 that implements the present invention may be distributed in nature as shown in FIG. 1(B). More specifically, a distributed computer processing system comprises more than one CPU 103 (three shown 103-1, 103-2,103-3) with each of these CPUs communicating with one another via message passing utility 113. The message passing utility 113 may be implemented via shared memory, a network connection, a high speed switch or some other method that allows data to be passed from CPU to CPU. A distributed computer processing system is preferably used for the recognition mode of the present invention because of the inherently parallel nature of the algorithm. More specifically, the multi-map data structure generated in the acquisition mode as described below is preferably partitioned amongst the CPUs of the distributed system. The multi-map data structure may also be partitioned amongst the various nonvolatile storage devices 108 associated with a given CPU 103. For example, the multi-map may be partitioned into nine portions $MM_{11}$, $MM_{12}$, $MM_{13}$, $MM_{21}$, $MM_{22}$, $MM_{23}$, $MM_{31}$, $MM_{32}$, $MM_{33}$ among three CPUs 103-1,103-2 and 103-3 and their associated nine storage devices 108-11, 108-12, 108-13, 108-21, 108-22, 108-23, 108-31, 108-32, 108-33 as shown. In addition, the vote table data structure may be similarly partitioned amongst the CPUs of the distributed system. When such a system is used in the recognition mode described below, as data elements are retrieved from the multi-map, such data elements are routed via the message passing utility 113 to the appropriate CPU for accumulation in the proper segment of the vote table. In the end, a distributed merge sort is preferably used to collate all of the resulting hypothesized matches on a single CPU.

A fingerprint is typically represented by data characterizing a collection of feature points (commonly referred to as "minutiae") associated with the fingerprint. The feature points associated with a fingerprint are typically derived from an image of the fingerprint utilizing image processing techniques. The method and apparatus of the present invention conceptually may be partitioned into two distinct modes: an acquisition mode and a recognition mode.

In the acquisition mode, for one or more fingerprint images, subsets (triplets) of the feature points for a given fingerprint image are generated in a deterministic fashion. One or more of the subsets (triplets) of feature points for the given fingerprint image is selected. For each selected subset (triplet), data is generated that characterizes the fingerprint in the vicinity of the selected subset (triplet). The data corresponding to the selected subset (triplet) is used to form a key (or index). The key is used to store and retrieve entries from a multi-map, which is a form of associative memory which permits more than one entry stored in the memory to be associated with the same key. An entry is generated that preferably contains an identifier that identifies the fingerprint image which generated this key and information (or pointers to such information) concerning the subset (triplet) of feature points which generated this key. The entry labeled by this key is then stored in the multi-map.

In the recognition mode, a query fingerprint image is supplied to the system. Similar to the acquisition mode, subsets (triplets) of feature points of the query fingerprint image are generated in a deterministic fashion. One or more of the subsets (triplets) of the feature points of the query fingerprint image is selected. For each selected subset (triplet), data is generated that characterizes the query fingerprint in the vicinity of the selected subset (triplet). The data corresponding to the selected subset is used to form a key. All entries in the multi-map that are associated with this key are retrieved. As described above, the entries includes an identifier that identifies the referenced fingerprint image. For each item retrieved, a hypothesized match between the query fingerprint image and the reference fingerprint image is constructed. This hypothesized match is labeled by the identifier of the reference fingerprint image and optionally, parameters of the coordinate transformation which bring the subset (triplet) of features in the query fingerprint image into closest correspondence with the subset (triplet) of features in the reference fingerprint image. Hypothesized matches are accumulated in a vote table. The vote table is an associative memory keyed by the reference fingerprint image identifier and the transformation parameters (if used). The vote table stores a score associated with the corresponding reference fingerprint image identifier and transformation parameters (if used). When a newly retrieved item generates a hypothesis that already exists in the associative memory, the score corresponding to the retrieved item is updated, for example by incrementing the score by one. Finally, all the hypotheses stored in the vote table are sorted by their scores. This list of hypotheses and scores is preferably used to determine whether a match to the query fingerprint image is stored by the system. In the alternative, this list of hypotheses and scores may be used as an input to another mechanism for matching the query fingerprint image.

A more detailed description of the derivation of feature points and associated data, the acquisition mode, and the recognition mode is now set forth.

DERIVATION OF FEATURE POINTS AND ASSOCIATED DATA

The feature points of a fingerprint image are preferably extracted from a gray scale image of the fingerprint acquired by digitizing an inked card, by direct live-scanning of a finger using frustrated total internal reflection imaging, by 3-dimensional range-finding techniques, or by other technologies.

Figure 2:
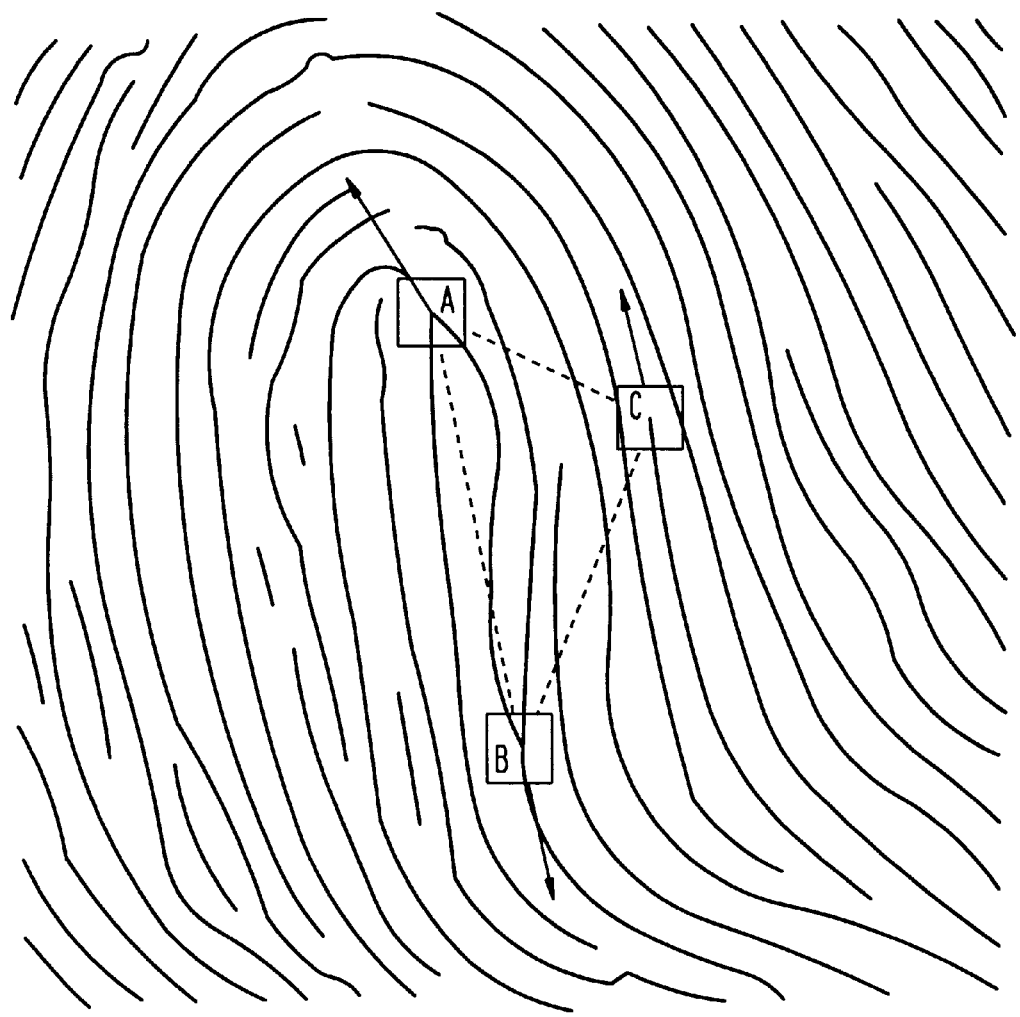
FIG. 2 is a pictorial representation of a fingerprint and the feature points therein.
Figure 3:
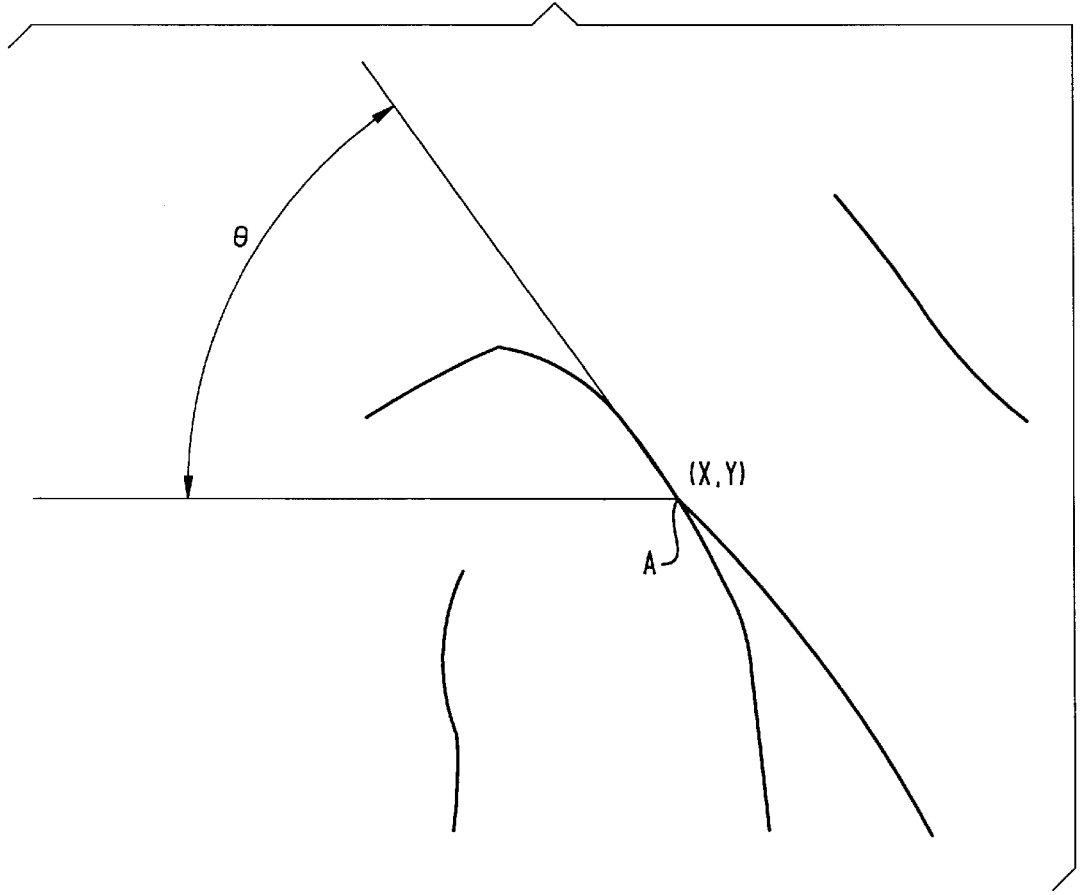
FIGS. 3 and 4 are pictorial illustrations of the parameteric data that characterize the feature points of FIG. 2.

The feature points of a fingerprint image are preferably determined from singularities in the ridge pattern of the fingerprint. As shown in FIG. 2, a ridge pattern includes singularities such as ridge endings and ridge bifurcation. Points A and B are examples of a ridge bifurcation. Point C is an example of a ridge ending. As shown in FIG. 3, each local feature is preferably characterized by the coordinates (x,y) of the local feature in a reference frame common to all of the local features in the given fingerprint image.

Figure 4:
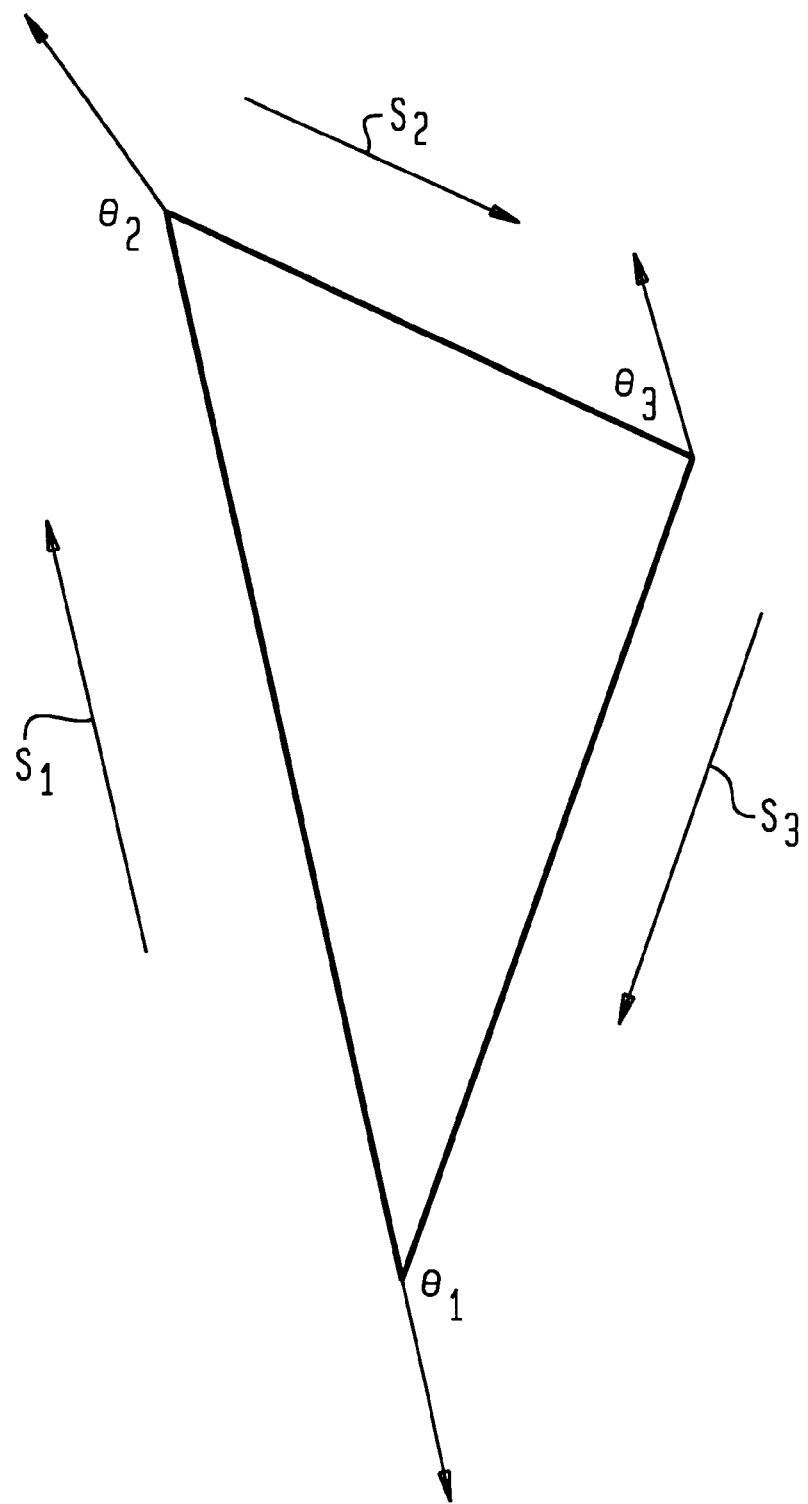

In the acquisition mode and recognition mode described in detail below, subsets (triplets) of feature points of a given fingerprint image are selected; and, for each selected subset (triplet), data is generated that characterizes the fingerprint image in the vicinity of the selected subset of feature points. Preferably, such data includes a distance S associated with each pair of feature points that make up the selected subset, and a local direction ($\theta$) of the ridge at coordinates (x,y) of each feature point in the selected subset. More specifically, the distance S associated with a given pair of feature points preferably represents the distance of a line drawn between the corresponding feature points. In addition, the local direction ($\theta$) associated with a given feature point preferably represents the direction of the ridge at the given feature point with respect to a line drawn from the given feature point to another feature point in the selected subset. For example, for the triplet of feature points A,B,C illustrated in FIGS. 2 and 3, the data characterizing the fingerprint image in the vicinity of the triplet A,B,C would include the parameters ($S_1$, $S_2,S_3,\theta_A,\theta_B,\theta_C$) as shown in FIG. 4.

In addition, the data characterizing the fingerprint image in the vicinity of the selected subset of feature points preferably includes a ridge count associated with the pairs of feature points that make up the selected subset. More specifically, the ridge count RC associated with a given pair of feature points preferably represents the number of ridges crossed by a line drawn between the corresponding feature points. For example, for the triplet of feature points A,B,C illustrated in FIGS. 2 and 3, the data characterizing the fingerprint image in the vicinity of the triplet A,B,C would additional include the ridge count parameters ($RC_{AB},RC_{AC}$, $RC_{BC}$), where $RC_{AB}$ represents the number of ridges crossed by a line drawn between feature points A and B, where $RC_{AC}$ represents the number of ridges crossed by a line drawn between feature points A and C, and where $RC_{BC}$ represents the number of ridges crossed by a line drawn between feature points B and C.

There are many different implementations for extracting feature and the associated data, all of which may be used by the present invention. For example, the feature points and associated data may be extracted automatically by image processing techniques as described in "Advances in Fingerprint Technology", Edited by Henry C. Lee, R. E. Gaensslen, CRC Press, Ann Arbor, Mich., Nalini K. Ratha and Shaoyun Chen and Anil K. Jain, "Adaptive flow orientation based texture extraction in fingerprint images", Journal of Pattern Recognition, vol. 28, no. 11, pp. 1657$\geq$1672, November, 1995, U.S. patent application No. 08/823,637, commonly assigned to the assignee of the present invention, entitled "System and Method Using Minutiae Pruning for Fingerprint Image Processing", filed concurrently herewith, and U.S. patent application No. 08/837,069, commonly assigned to the assignee of the present invention, entitled "System and Method for Determining Ridge Counts in Fingerprint Image Processing", filed concurrently herewith, all herein incorporated by reference in their entirety. A typical "dab" impression will have approximately forty feature points which are recognized by the feature extraction software, but the number of feature points can vary from zero to over one hundred depending on the morphology of the finger and imaging conditions.

ACQUISITION MODE

Figure 5:
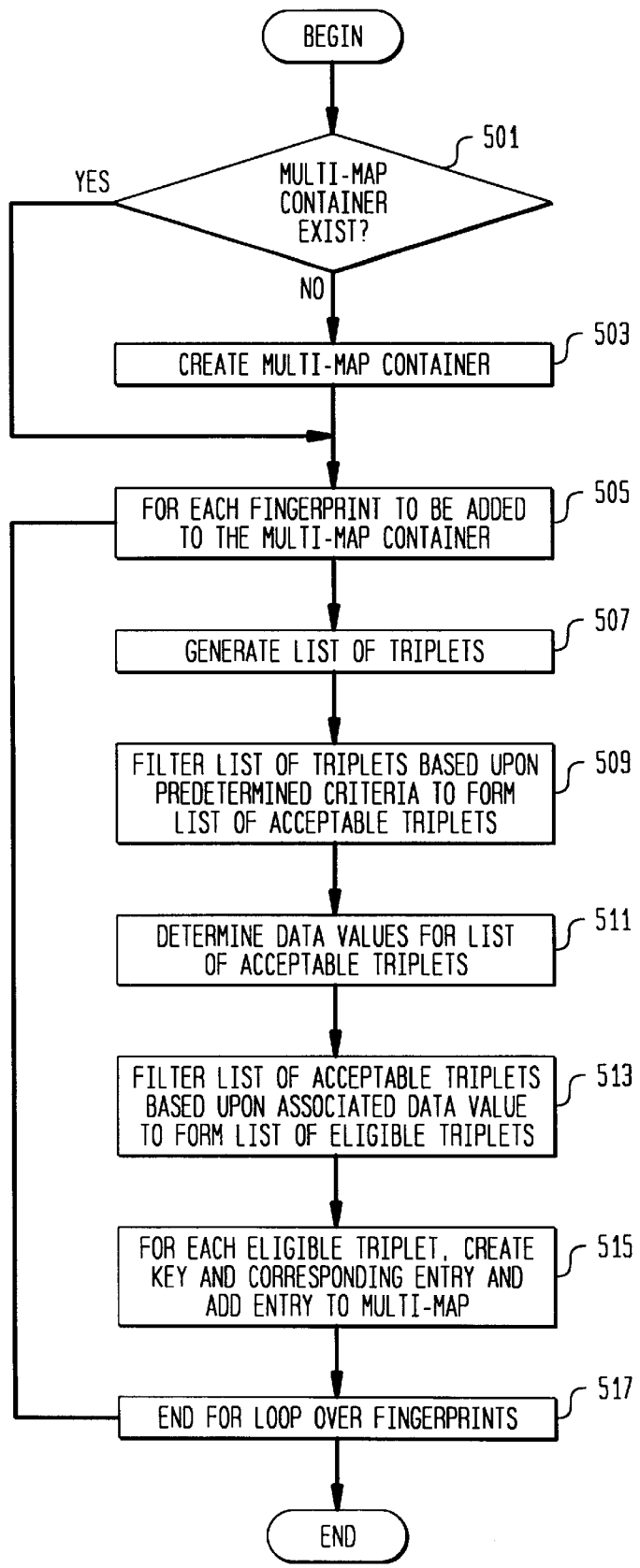
FIG. 5 is a flow chart illustrating the acquisition mode of the system according to the present invention.

A more detailed description of the acquisition mode is now set forth. As shown in FIG. 5, the acquisition mode preferably begins in step 501 by checking whether a multi-map container exists. As described above, the multi-map container is an associative memory which permits more than one entry stored in the memory to be associated with the same key. A detailed description of a multi-map is set forth in D. R. Musser and Atul Saini, STL Tutorial and Reference Guide: C++ Programming with the Standard Template Library (Addison-Wesley 1996), herein incorporated by reference in its entirety. Preferably, the multi-map container is formed from a hash table. A more detailed description of a hash table may be found in R. Sedgewick, Algorithms in C++ (Addison-Wesley 1992), herein incorporated by reference in its entirety. In the alternative, the multi-map container may be formed from a linked list data structure, or a tree structure such as an AVL-tree or B* tree as described in D. R. Musser and Atul Saini. One skilled in the art will realize that there are many possible underlying implementations for the multi-map data structure. If in step 501 it is determined that the multi-map container exists, operation continues to step 505. If in step 501 it is determined that a multi-map container does not exist, operation continues to step 503 wherein the multi-map container is created and operation continues to step 505.

In step 505–517, the operation loops through each fingerprint image that is to be added to the multi-map database. In step 507, the list of subsets of the feature points for the given fingerprint image is generated in a deterministic fashion. Each subset preferably is composed of a set of three feature points (triplet or tuple). However, the present invention is not limited in this respect and, thus, each subset may include a set of n (where n is an integer >0) feature points, which may be referred to as an n-tuple. In step 509, the list of subsets (triplets) is preferably filtered based upon a predetermined criterion to form a list of acceptable subsets (triplets). The filtering operation of step 509 is used because an exhaustive list of subsets may be extremely large and have a negative impact on the performance of the system. A more detailed description of the generation of the list of triplets and associated filtering operation of steps 507 and 509 is described below with respect to FIG. 6.

In step 511, each subset (triplet) within the list of acceptable subsets (triplets) is selected and a data value is generated that is associated with the selected subset (triplet). An example of the generation of a data value corresponding to a selected subset (triplet) is described below with respect to FIG. 7. The operation preferably includes a step 513 wherein the list of acceptable subsets (triplets) is filtered based upon a criterion of the data values associated with each subset (triplet) in the list of acceptable subsets (triplets), thereby forming a list of eligible subsets (triplets). The filtering operation of step 513 is used because an exhaustive list of acceptable subsets (triplets) may be extremely large and have a negative impact on the performance of the system. An example of the filtering operation of the list of acceptable triplets is described below with respect to FIG. 8.

In step 517, each eligible subset (triplet) in the list of eligible subsets (triplets) is selected and a key is created that corresponds to selected subset (triplet). An example of the operation of the system in generating keys that correspond to the triplets in the list of eligible triplets is described below with respect to FIG. 9. In addition, in step 517, a multi-map entry corresponding to the selected subset (triplet) is created. The entry preferably includes an identifier that identifies the given fingerprint image and information (or a pointer to such information) concerning the corresponding subset (triplet) of feature points. The entry labeled by this key is then added to the multi-map as shown in FIG. 10.

FIG. 6 illustrates an example of the operations of the system in generating a list of triplets and associated filtering. Those skilled in the art will recognize that there are many ways to generate such a list of triplets and perform the associated filtering operation. As described below, the list of triplets is preferably generated such that the list includes a series of triplets. The operation begins in step 600 by extracting the feature points (minutiae) from the acquired fingerprint image. A more detailed description of the derivation of such feature points is described above. The operation then continues to a series of three nested for loops 601–617, 603–615, and 605–617. The first for loop 601–617 assigns a value to a first index I, wherein the value of I ranges from (1. . . N), where N is the number of feature points (minutiae) in the given fingerprint image. The second for loop 603–615 assigns a value to a second index J, wherein the value of J ranges from (+1. . . N). And the third for loop 605–613 assigns a value to a third index K, wherein the value of K ranges from (J+1. . . N). In step 607, the triplet identified by the indices (I,J,K) is selected. As described above, the values of indices I,J,K are assigned such that a series of triplets are selected and a filter test is performed to determine if the triplet (I,J.K) is acceptable. Preferably, the filter test checks whether the distances between each pair of feature points (minutiae) in the triplet (I,J,K) are within an acceptable range. Thus, if the pairs of feature points (minutiae) for a given triplet (I,J,K) are denoted as dij, djk, dik, and the acceptable range is the range of distances between dmin and dmax, the filter test may be represented by the following:

if((dij∈ [dmin,dmax]) and (djk∈ [dmin,dmax]) and (dik∈ [dmin,dmax]))
        then triplet (I,J,K) is acceptable;
        else triplet (I,J,K) is not acceptable.

If in step 607, the filter test determines that the triplet (I,J,K) is acceptable, operation continues to step 609, wherein the triplet (I,J,K) is added to the list of acceptable triplets. However, if in step 607, the filter test determines that the triplet (I,J,K) is not acceptable, operation returns back to step 605 to process the next triplet in the sequence.

FIG. 7 illustrates an example of the generation of a data value that corresponds to the triplets in the list of acceptable triplets. The operation begins with a for loop 701–705 that loops through each triplet in the list of acceptable triplets. In step 703, for each triplet in the list of acceptable triplets a data value H is computed that corresponds to the given triplet. The data value H is preferably calculated as a function of the pairwise distances associated with the given triplet. The pairwise distances may be encoded into a binary integer by dividing the allowable range of lengths for the side of a triangle into bins. If a distance falls into the first bin, it is encoded as a zero (0), if it falls into the next bin, it is encoded as a one (1) and so forth. For example, the pairwise distances may be encoded into a binary form of k bit length. In this case, the data value H represented by a binary integer of 2*k bits may be represented as follows:

1) the most significant k bits correspond to the maximum k bit binary encoding of such pairwise distances for the given triplet; and
2) the least significant k bits correspond to the minimum k bit binary encoding of such pairwise distances for the given triplet.

In this example, the representation of the data value H may be computed as follows:

$$H = \max(A,B,C) * E_{dmax} + \min(A,B,C);$$

where A,B,C represent a k bit binary encoding of the pairwise distances associated with the given triplet, and $E_{dmax}$ represents the value $2^k$.

It should be understood that the data value H may be computed based upon alternative functions of the distances associated with the given triplet, and as a function of other invariant parameters associated with the given triplet of feature points including, for example, the ridge counts, local direction angles and other parametric data.

Figure 8:
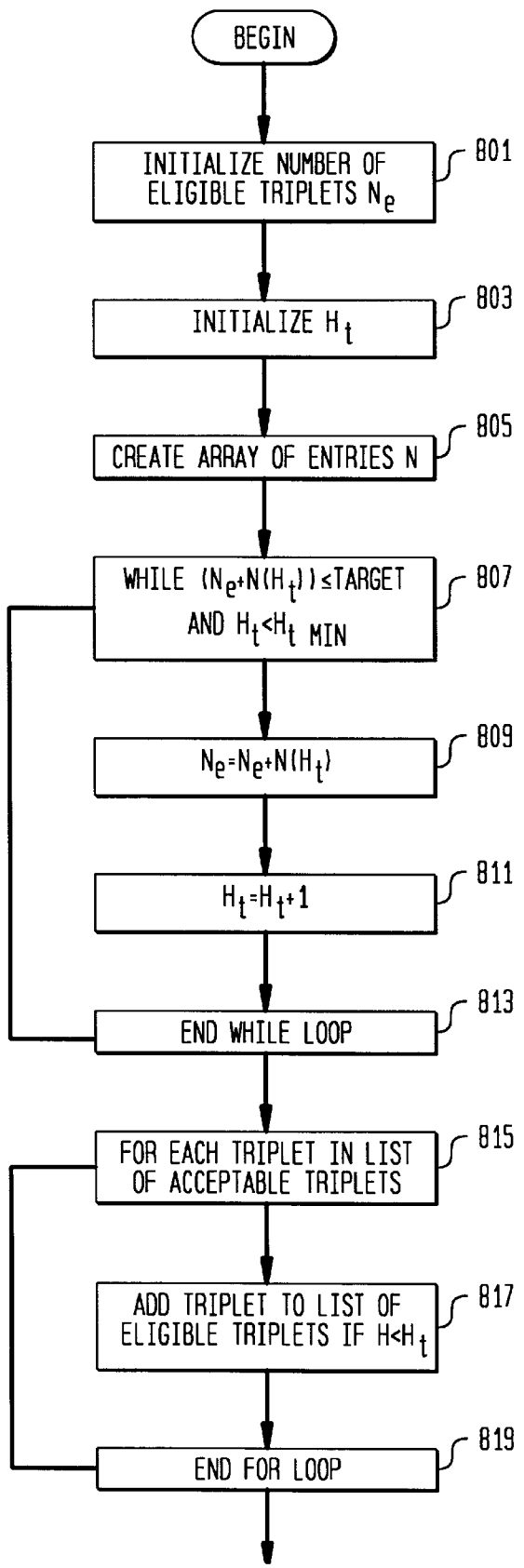
FIG. 8 is a flow chart illustrating an example of the filtering of the subsets (triplets) of feature points based upon the corresponding data values according to the present invention.

FIG. 8 illustrates an example of the filtering operation of the list of acceptable triplets. The operation begins in step 801 by initializing a variable $N_e$ that represents the a count of eligible triplets selected from the list of acceptable triplets. Preferably, $N_e$ is initialized to zero. In step 803, a variable $H_t$ is initialized. For a given value of $H_t$, there are zero or more triplets in the list of acceptable triplets whose data value H corresponds to the given value $H_t$. Preferably, $H_t$ is initialized to zero. In step 805, an array of entries $N_0$, $N_1$. $N_2$. . . $N_{Hmax-1}$ is created. Each entry corresponds to a possible data values computed in step 703 for the triplets in the list of acceptable triplets, and contains a value representing the number of triplets that share the corresponding data value. In the example presented above where the data value H is represented a binary integer of 2*k bits length, there would be $2^{2k}$ entries in the array. Then, a loop 807–813 is performed while the sum of $N_e$ and the value stored in the array entry indexed by $H_t$ is less than or equal to a predetermined target value and $H_t$ is less than a predetermined maximum value, which is preferably set to the number of entries in the list. In the loop 807–813, a step 809 is performed wherein the variable $N_e$ is increased by the value stored in the array entry indexed by $H_t$. In addition, in step 811, the variable $H_t$ is incremented. When the sum of $N_e$ and the value stored in the array entry indexed by Ht entry is greater than the predetermined target value or Ht is greater than or equal to the predetermined maximum value, a loop 815–819 is performed over the list of acceptable triplets. In step 817, for the given triplet, if the data value H computed in step 703 for the given triplet is less than Ht, then the triplet is added to the list of eligible triplets. After performing loop 815–819, the filtering operation of the list of acceptable triplets ends.

Figure 9:
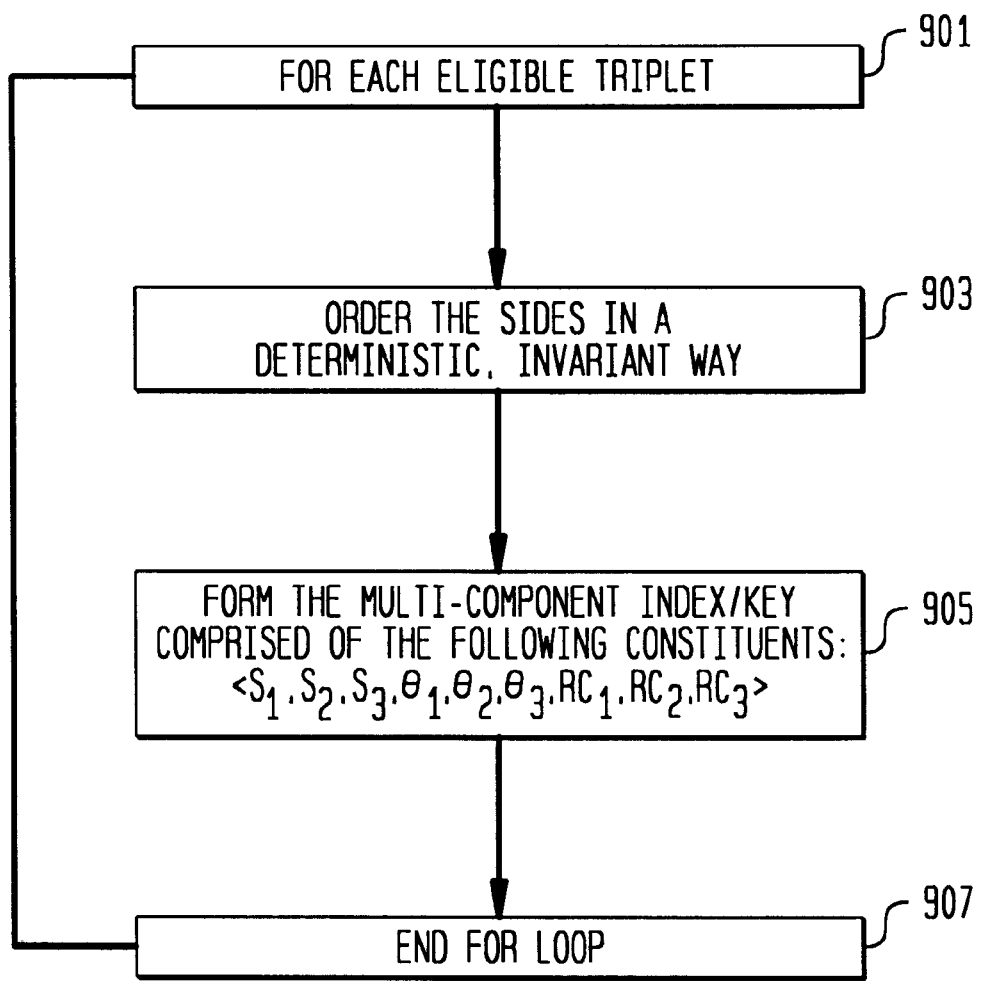
FIG. 9 is a flow chart illustrating an example of the generation of keys corresponding to subsets (triplets) of feature points according to the present invention.
Figure 10:
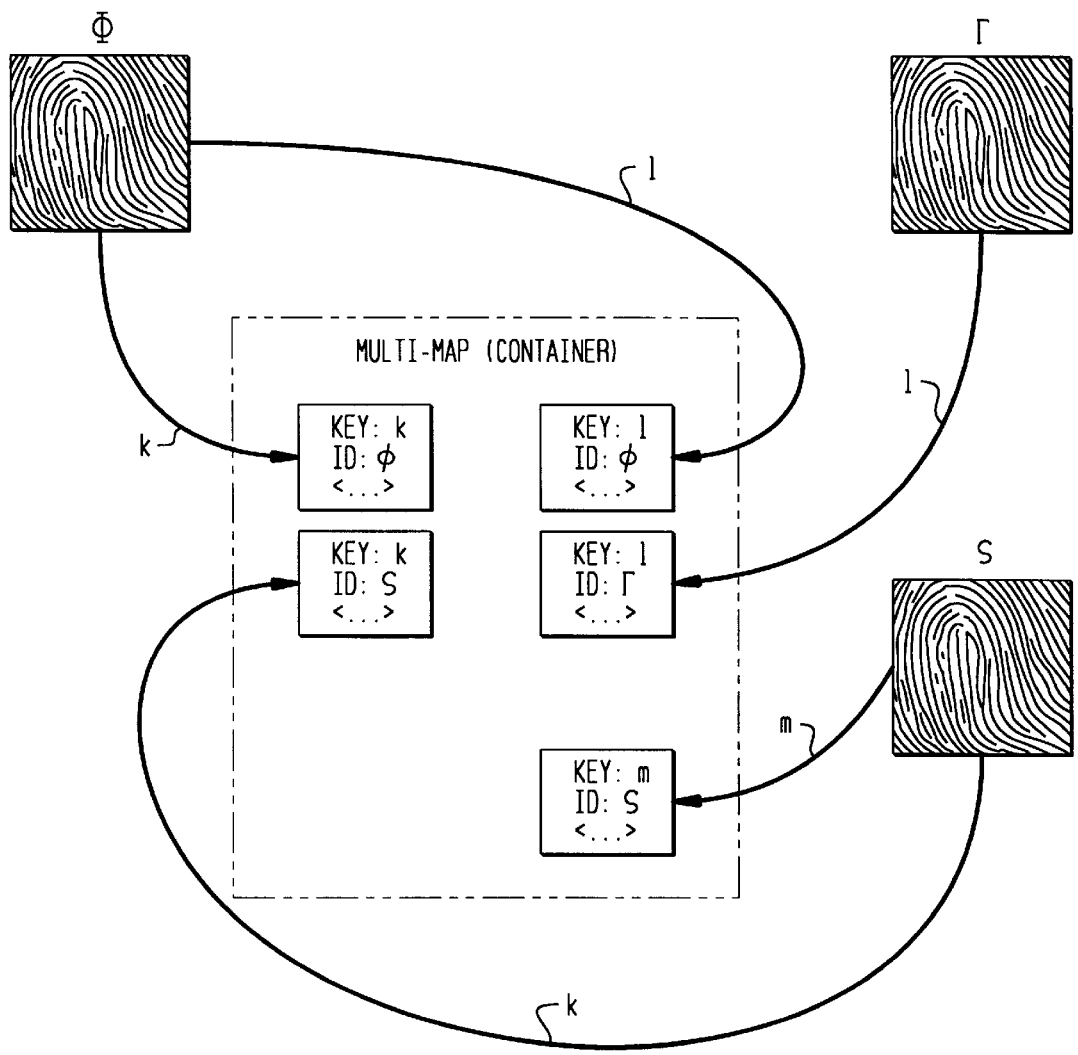
FIG. 10 is a pictorial illustration of a multi-map container that permits one or more entries to be associated with a key.

FIG. 9 illustrates an example of the operation of the system in generating keys that correspond to the triplets of the list of eligible triplets. The operation begins in step 901 with a for loop 901–907 that loops through each triplet in the list of eligible triplets. Steps 903 and 905 are performed for each triplet in the loop. In step 903, the sides are ordered in a predetermined manner. Preferably, the ordering of the sides is performed in such a manner that the ordering is invariant when the triplet of feature points is subjected to scaling, translation and/or rotation. For example, the ordering may be accomplished by first selecting the largest of the three sides associated with the triplet, and then enumerating successive sides by proceeding in a predefined orientation/sense (for example, a clockwise sense) with respect to the largest side.

In step 905, data is generated that characterizes the fingerprint image in the vicinity of the triplet. Preferably, the ordering of the sides is performed in such a manner that the ordering is invariant when the triplet of feature points is subjected to one or more of a scaling, translation and rotation operation. For example, the data that characterizes the fingerprint image in the vicinity of the triplet may include distances $S_x, S_y, S_z$, local directions $\theta_x, \theta_y, \theta_z$, and ridge counts $RC_x, RC_y, RC_z$. The distances $S_x, S_y, S_z$ represent the distance between the pairs of feature points that make up the triplet. A more detailed description of the distances is described above. Perferably, the ordering of the distances $S_x, S_y, S_z$ coincide with the ordering of the sides determined in step 903. The distance data $S_x, S_y, S_z$ is preferably encoded into a binary integer as describe above. The other quantities are encoded similarly. The range of angle values is binned and the angle values are encoded. the ridge count values are typically encoded by taking the ridge count modulo the number of values used for encoding. The preferred implementation is to encode the ridge count by taking the ridge count modulo 8. The local directions $\theta_x, \theta_y, \theta_z$ represent the directions of the ridge at the feature points that make up the triplet with respect to the lines that represent the distances $S_x, S_y, S_z$, respectively. A more detailed description of such local directions is described above. Preferably, the ordering of the local directions $\theta_x, \theta_y, \theta_z$ coincide with the ordering of the sides determined in step 903. The ridge counts $RC_x, Rc_y, RC_z$ are ridge counts associated with the pairs of feature points that make up the triplet. Preferably, the ordering of the ridge counts $RC_x, Rc_y, RC_z$ coincide with the ordering of the sides determined in step 903.

In addition, in step 905, the generated data that characterizes the fingerprint image in the vicinity of the triplet is used to form a key (or index). For example, the key may include as components $S_x, S_y, S_z, \theta_x, \theta_y, \theta_z, RC_x, Rc_y, RC_z$ as shown in FIG. 9.

RECOGNITION MODE

Figure 11A:
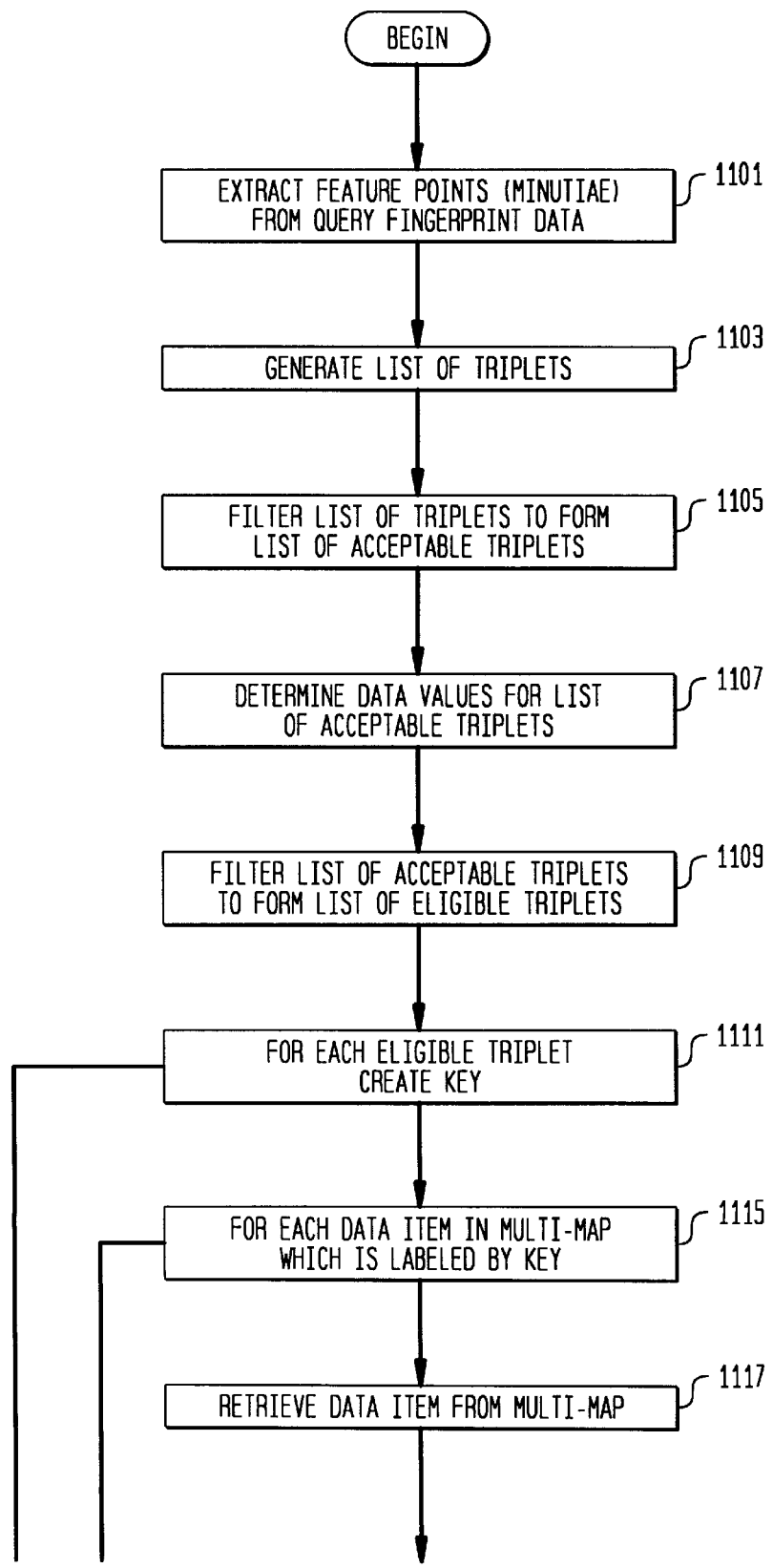
FIGS. 11(A) and (B) is a flow chart illustrating the recognition mode of the system according to the present invention.
Figure 11B:
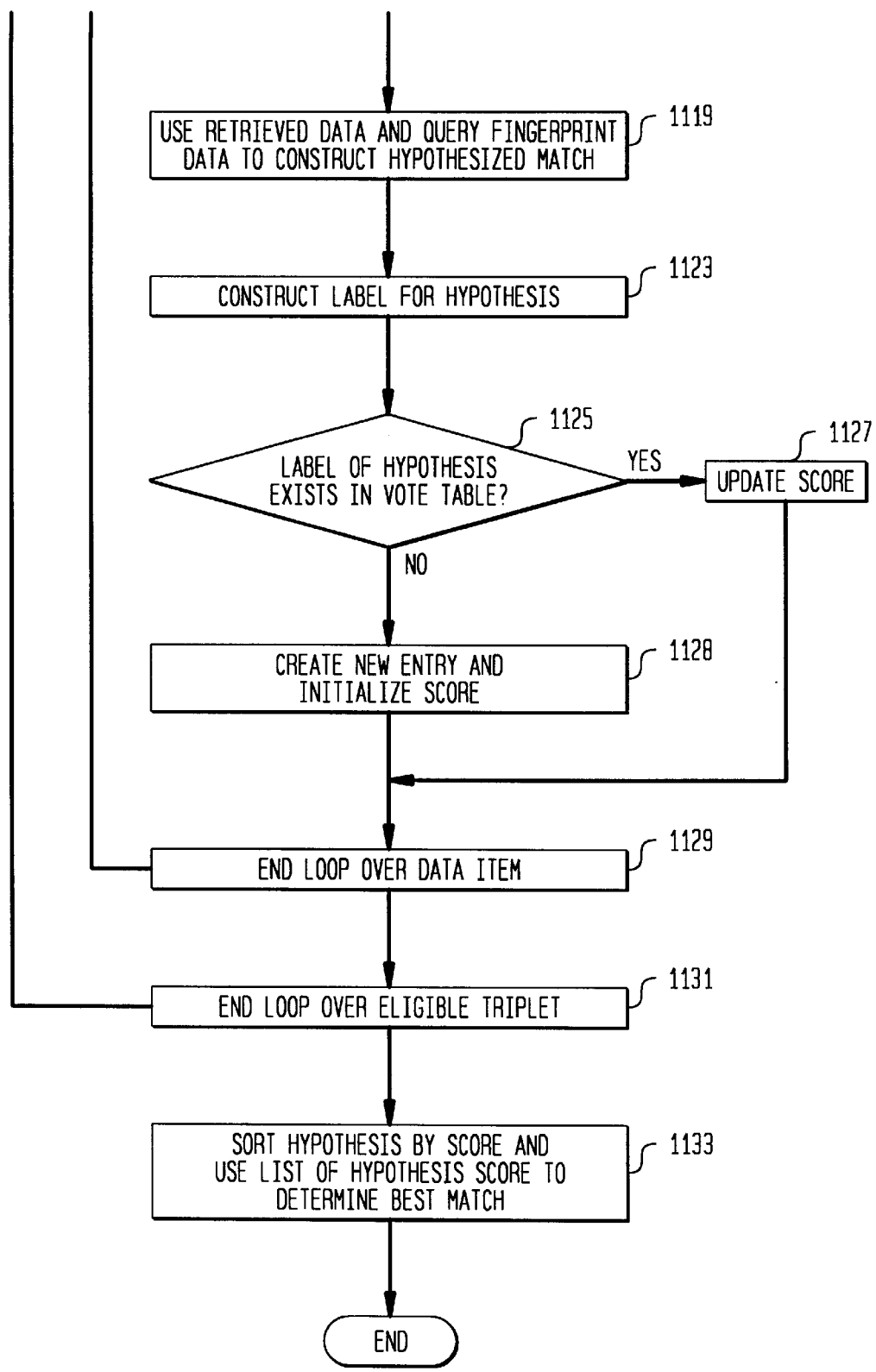

A more detailed description of the recognition mode is now set forth. As shown in FIGS. 11(A) and (B), the recognition mode preferably begins in step 1101 by extracting the feature points (minutiae) from the query fingerprint image. A more detailed description of the derivation of such feature points is described above. The operation then continues to steps 1103 through 1111 wherein the operations of steps 507 through 515 (described above for the acquired fingerprint) are performed for the query fingerprint. More specifically, step 1103 generates a list of subsets (triplets) of the feature points for the query fingerprint image. In step 1105, the list of subsets (triplets) is preferably filtered based upon a predetermined criterion to form a list of acceptable subsets (triplets) of the target fingerprint image. A more detailed description of the generation of the list of triplets and associated filtering operation of steps 1103 and 1105 is above with respect to FIG. 6.

In step 1107, each subset (triplet) within the list of acceptable triplets is selected and a data value is generated that is associated with the selected subset (triplet). An example of the generation of a data value corresponding to a selected subset (triplet) is described above with respect to FIG. 7. The operation preferably includes a step 1109 wherein the list of acceptable subsets (triplets) is filtered based upon a criterion of the data values associated with the subsets (triplets) in the list of acceptable subsets (triplets), thereby forming a list of eligible subsets (triplets). An example of the filtering operation of the list of acceptable triplets is described above with respect to FIG. 8.

The recognition phase then proceeds to for loop 1111–1131 wherein the operation loops through the list of eligible subsets (triplets). In step 1111, for each eligible subset (triplet) in the list of eligible subsets (triplets), a key is created that corresponds to the subset (triplet). An example of the operation of the system in generating keys that correspond to the triplets in the list of eligible triplets is described above with respect to FIG. 9.

For the given eligible triplet, for loop 1115–1129 is performed wherein the entries in the multi-map that are associated with the key corresponding to the given subset (triplet) are identified and a loop is performed over each of the matching entries. For each matching entry, steps 1117 through 1123 are performed.

In step 1117, the matching entry is retrieved from the multi-map. As described above, the matching entry preferably includes an identifier that identifies the fingerprint image which generated the associated key and information (or pointers to such information) concerning the subset (triplet) of feature points which generated the associated key.

In step 1119, an hypothesized match between the query fingerprint image and the reference fingerprint image is constructed. The hypothesized match is preferably constructed utilizing data associated with the given subset (triplet) of feature points in the query fingerprint image and data stored in the matching entry, which is associated with a subset (triplet) of feature points in the reference fingerprint image. More specifically, the hypothesized match is preferably constructed by determining the parameters of one or more transformation matrices that represent one or more of a rotation, translation and scaling operation such the location of the subset (triplet) of feature points of the query fingerprint image correspond to location of the subset (triplet) of feature points in the reference fingerprint image, which is identified by matching entry. Preferably, the parameters of the transformation matrices are determined using a least squares estimation technique between the location of the subset (triplet) of feature points of the query fingerprint image and the location of the subset (triplet) of feature points in the reference fingerprint image. A more detailed description of the least squares technique may be found in R. M. Haralick et al., "Pose Estimation from Corresponding Point Data," IEEE Transactions on Systems, Man and Cybernetics, 19(6), 1989, pp. 1426–1446, herein incorporated by reference in its entirety. The least squared technique computes the parameters of one or more transformation matrices representing rotation, translation and/or scaling that bring the subset (triplet) of feature points of the query fingerprint image into closest correspondence with the subset (triplet) of feature points in the reference fingerprint image.

In step 1123, the hypothesized match is labeled by the identifier of the reference fingerprint image and, optionally, the parameters of the one or more transformation matrices constructed in step 1119. The hypothesized matches are stored in a vote table, which is an associative memory keyed by the reference fingerprint image identifier and the transformation parameters (if used). The vote table stores a score associated with the corresponding reference fingerprint image identifier and transformation parameters (if used) as shown in FIG. 12. Preferably, the vote table is implemented as a map. A detailed description of a map is set forth in D. R. Musser and Atul Saini, STL Tutorial and Reference Guide: C++ Programming with the Standard Template Library (Addison-Wesley 1996), incorporated by reference above in its entirety. The map may be formed from a hash table. A more detailed description of a hash table may be found in R. Sedgewick, Algorithms in C++ (Addison-Wesley 1992), incorporated by reference above in its entirety. In the alternative, the map may be formed from a linked list data structure, or a tree structure such as an AVL-tree or B*tree as described in D. R. Musser and Atul Saini. One skilled in the art will realize that there are many possible underlying implementations for the map data structure.

In step 1125, it is determined if the hypothesized match generated in step 1119 already exists in vote table. Preferably, this is accomplished by checking whether the key generated in step 1123 already exists in the vote table. If so, operation continues to step 1127 wherein the score corresponding to the hypothesized match is updated, for example by incrementing the score by one. If in step 1125 it is determined that the hypothesized match generated in step 1119 does not exist in the vote table (i.e., the key generated in step 1123 does not exist in the vote table), operation continues to step 1129 wherein a new entry is created for the hypothesized match and the score of the new entry is initialized, for example, to a value of 1.

Finally, after completing for loop 1111–1131, in step 1133, the hypothesized matches stored in the vote table are preferably sorted by their score and this list of hypothesized matched and scores is preferably used to determine whether a match to the query fingerprint image is stored by the system. For example, the one or more hypothesized matches with the highest score may be selected. In another example, hypothesized matches that achieve a score above a predetermined threshold may be selected. The identifier of each selected hypothesized match may then be used to identify a corresponding fingerprint image stored in the multi-map database. The system then preferably generates a display (or other output) that identifies the one of more fingerprint images stored in the multi-map database that correspond to the selected hypothesized matches as a potential match to the query fingerprint image.

In the alternative, this list of hypothesized matches and scores may be used as an input to another mechanism for matching the query fingerprint image.

In summary, the present invention as describe above provides an encoding for fingerprint information which is manifestly rotation and translation invariant. In the alternative, one may normalize the distances between feature points in order to provide a scale invariant encoding. Such normalized distances are described in U.S. patent application Ser. No. 08/823,637, commonly assigned to the assignee of the present invention, entitled "System and Method Using Minutiae Pruning for Fingerprint Image Processing", incorporated by reference above in its entirety.

In addition, the present invention provides combinatorial key/index generation, which is robust against image acquisition noise that removes feature points (minutiae) or adds spurious feature points to the data. Moreover, the present invention provides highly descriptive keys/indices that result in only a small fraction of the total amount of data in the database (the multi-map) being processed during an identification query (retrieval). Because these keys/indices represent local information, an error in computing one key does not eliminate all chances of matching the associated fingerprint. This is an improvement over the existing art, which typically relies on filtering or classification of the fingerprints to limit the size of the database which must be searched.

Although the invention has been shown and described with respect to the particular embodiment(s) thereof, it should be understood by those skilled in the art that the foregoing and various other changes, omissions, and additions in the form and detail thereof may be made without departing from the spirit and scope of the invention.

We claim:

1. In a system wherein at least one fingerprint image is stored in a database, a method for generating and storing data characterizing said fingerprint image, the method comprising the steps of:

identifying a plurality of feature points in said fingerprint image, wherein said feature points are derived from singularities in ridge patterns in said fingerprint image;

grouping said plurality of feature points into a first plurality of subsets, wherein each subset is associated with a predetermined number K of feature points, wherein K is an integer in the range K>3;

for at least one subset of said first plurality of subsets of feature points, generating an entry comprising an identifier that identifies said fingerprint image, generating a key that corresponds to said at least one subset of feature points, wherein said key characterizes said fingerprint image in the vicinity of said at least one subset of feature points wherein said key is based upon at least one of:

ridge count data which represents a ridge count between pairs of feature points in said at least one subset of feature points, distance data which represents distance between pairs of feature points in said at least one subset of feature points, and ridge angle data which represents local direction of a ridge associated with feature points in said at least one subset of feature points; and storing said entry in a memory, wherein said key is associated with said entry.

2. The method of claim 1, wherein said singularities comprise one of a ridge ending and a ridge bifurcation.

3. The method of claim 1, wherein the entry generation step, key generation step and entry storing step are performed for each subset of a second plurality of subsets of feature points, wherein said second plurality of subsets is less than said first plurality of subsets.

4. The method of claim 3, wherein said second plurality of subsets is formed by filtering said first plurality of subsets.

5. The method of claim 4, wherein said first plurality of subsets are filtered based upon distance between pairs of feature points in said first plurality of subsets.

6. The method of claim 5, wherein said filtering of said first plurality of subsets includes the following steps applied to each given subset of said first plurality of subsets:

determining if the distance between each pair of feature points in the given subset is within a predetermined range;

if it is determined that the distance between each pair of feature points in the given subset is within said predetermined range, then including said given subset in said second plurality of subsets; and if it is determined that the distance between each pair of feature points in the given subset is not within said predetermined range, then excluding said given subset from said second plurality of subsets.

7. The method of claim 4, wherein said first plurality of subsets are filtered based upon data values associated with said first plurality of subsets, wherein said data value associated with a given subset is based upon a function of at least one invariant parameter associated with said feature points of said given subset.

8. The method of claim 7, wherein said invariant parameter represents a distance between pairs of feature points of said given subset.

9. The method of claim 8, wherein said data value associated with a given subset includes a first portion and a second portion, wherein said first portion is based upon a maximum distance between pairs of feature points of said given subset, and wherein said second portion is based upon a minimum distance between pairs of feature points of said given subset.

10. The method of claim 7, wherein said filtering of said first plurality of subsets includes the steps of:

identifying a given data value for which a number N of subsets associated with a data value less than or equal to said given data value is greater than a predetermined limit Nmax;

removing from said first plurality of subsets those subsets associated with a data value greater than or equal to said given data value.

11. In a system wherein at least one fingerprint image is stored in a database, a program storage device readable by a machine, tangibly embodying a program of instructions executable by the machine to perform method steps for generating and storing data characterizing said fingerprint image, the method steps comprising:

identifying a plurality of feature points in said fingerprint image, wherein said feature points are derived from singularities in ridge patterns in said fingerprint image;

grouping said plurality of feature points into a first plurality of subsets, wherein each subset is associated with a predetermined number K of feature points, wherein K is an integer in the range K>3;

for at least one subset of said first plurality of subsets of feature points, generating an entry comprising an identifier that identifies said fingerprint image, generating a key that corresponds to said at least one subset of feature points, wherein said key characterizes said fingerprint image in the vicinity of said at least one subset of feature points, wherein said key is based upon at least one of:

ridge count data which represents a ridge count between pairs of feature points in said at least one subset of feature points, distance data which represents distance between pairs of feature points in said at least one subset of feature points, and ridge angle data which represents local direction of a ridge associated with feature points in said at least one subset of feature points; and storing said entry in a memory, wherein said key is associated with said entry.

12. The program storage device of claim 11, wherein said singularities comprise one of a ridge ending and a ridge bifurcation.

13. The program storage device of claim 11, wherein the entry generation step, key generation step and entry storing step are performed for each subset of a second plurality of subsets of feature points, wherein said second plurality of subsets is less than said first plurality of subsets.

14. The program storage device of claim 13, wherein said second plurality of subsets is formed by filtering said first plurality of subsets.

15. The program storage device of claim 14, wherein said first plurality of subsets are filtered based upon distance between pairs of feature points in said first plurality of subsets.

16. The program storage device of claim 15, wherein said filtering of said first plurality of subsets includes the following steps applied to each given subset of said first plurality of subsets:

determining if the distance between each pair of feature points in the given subset is within a predetermined range;

if it is determined that the distance between each pair of feature points in the given subset is within said predetermined range, then including said given subset in said second plurality of subsets; and if it is determined that the distance between each pair of feature points in the given subset is not within said predetermined range, then excluding said given subset from said second plurality of subsets.

17. The program storage device of claim 14, wherein said first plurality of subsets are filtered based upon data values associated with said first plurality of subsets, wherein said data value associated with a given subset is based upon a function of at least one invariant parameter associated with said feature points of said given subset.

18. The program storage device of claim 17, wherein said invariant parameter represents a distance between pairs of feature points of said given subset.

19. The program storage device of claim 18, wherein said data value associated with a given subset includes a first portion and a second portion, wherein said first portion is based upon a maximum distance between pairs of feature points of said given subset, and wherein said second portion is based upon a minimum distance between pairs of feature points of said given subset.

20. The program storage device of claim 17, wherein said filtering of said first plurality of subsets includes the steps of:

identifying a given data value for which a number N of subsets associated with a data value less than or equal to said given data value is greater than a predetermined limit Nmax;

removing from said first plurality of subsets those subsets associated with a data value greater than or equal to said given data value.

21. In a system wherein a plurality of fingerprint images are stored in a database, characterized in that said system includes a memory storing a plurality of entries, wherein each entry comprises an identifier that identifies a corresponding fingerprint image, and wherein each entry is associated with a first key that corresponds to at least one subset of feature points in the corresponding fingerprint image, wherein said first key characterizes the corresponding fingerprint image in the vicinity of said at least one subset of feature points, wherein said first key is based upon at least one of ridge count data which represents a ridge count between pairs of feature points in said at least one subset of feature points in the corresponding fingerprint image, distance data which represents distance between pairs of feature points in said at least one subset of feature points in the corresponding fingerprint image, and ridge angle data which represents local direction of a ridge associated with feature points in said at least one subset of feature points in the corresponding fingerprint image, a method for determining similarity between a query fingerprint image and said plurality of fingerprint images stored in said database, the method comprising the steps of:

identifying a plurality of feature points in said query fingerprint image, wherein said feature points are derived from singularities in ridge patterns in said query fingerprint image;

grouping said plurality of feature points in said query fingerprint image into a first plurality of subsets, wherein each subset is associated with a predetermined number K of feature points, wherein K is an integer in the range K>3;

for at least one subset of said first plurality of subsets of feature points in said query fingerprint image, generating a second key that corresponds to said at least one subset of feature points in said query fingerprint image, wherein said second key characterizes said query fingerprint image in the vicinity of said at least one subset of feature points in said query fingerprint image, wherein said second key is based upon at least one of:

ridge count data which represents a ridge count between pairs of feature points in said at least one subset of feature points in said query fingerprint image, distance data which represents distance between pairs of feature points in said at least one subset of feature points in said query fingerprint image, and ridge angle data which represents local direction of a ridge associated with feature points in said at least one subset of feature points in said query fingerprint image, retrieving from said memory entries that are associated with a first key that corresponds to said second key, and for at least one entry retrieved from said memory, generating data that represents a match hypothesis associated with said query fingerprint image and a fingerprint image stored in said database that corresponds to said at least one entry retrieved from said memory, wherein said data comprises an identifier that identifies said fingerprint image stored in said database that corresponds to said at least one entry retrieved from said memory, determining a score associated with said data, and storing said data and score as an entry in a vote table.

22. The method of claim 21, further comprising the step of:

selecting one or more entries of said vote table based upon said score associated with said entries; and identifying at least one fingerprint image that corresponds to the selected entries of said vote table as a potential matching fingerprint image to said query fingerprint image.

23. The method of claim 21, wherein said data that represents said match hypothesis comprises parameters of at least one transformation matrix.

24. The method of claim 23, wherein said at least one transformation matrix represents one of rotation, translation and scaling between location of said at least one subset of feature points in said query fingerprint image and location of a subset of feature points that correspond to said at least one entry retrieved from said memory.

25. The method of claim 21, wherein said singularities comprise one of a ridge ending and a ridge bifurcation.

26. The method of claim 21, wherein the key generation step and the entry retrieving step are performed for each subset of a second plurality of subsets of feature points, wherein said second plurality of subsets is less than said first plurality of subsets.

27. The method of claim 26, wherein said second plurality of subsets is formed by filtering said first plurality of subsets.

28. The method of claim 27, wherein said first plurality of subsets are filtered based upon distance between pairs of feature points in said first plurality of subsets.

29. The method of claim 28, wherein said filtering of said first plurality of subsets includes the following steps applied to each given subset of said first plurality of subsets:

determining if the distance between each pair of feature points in the given subset is within a predetermined range;

if it is determined that the distance between each pair of feature points in the given subset is within said predetermined range, then including said given subset in said second plurality of subsets; and if it is determined that the distance between each pair of feature points in the given subset is not within said predetermined range, then excluding said given subset from said second plurality of subsets.

30. The method of claim 27, wherein said first plurality of subsets are filtered based upon data values associated with said first plurality of subsets, wherein said data value associated with a given subset is based upon a function of at least one invariant parameter associated with said feature points of said given subset.

31. The method of claim 30, wherein said invariant parameter represents a distance between pairs of feature points of said given subset.

32. The method of claim 31, wherein said data value associated with a given subset includes a first portion and a second portion, wherein said first portion is based upon a maximum distance between pairs of feature points of said given subset, and wherein said second portion is based upon a minimum distance between pairs of feature points of said given subset.

33. The method of claim 30, wherein said filtering of said first plurality of subsets includes the steps of:

identifying a given data value for which a number N of subsets associated with a data value less than or equal to said given data value is greater than a predetermined limit Nmax;

removing from said first plurality of subsets those subsets associated with a data value greater than or equal to said given data value.

34. In a system wherein a plurality of fingerprint images are stored in a database, characterized in that said system includes a memory storing a plurality of entries, wherein each entry comprises an identifier that identifies a corresponding fingerprint image, and wherein each entry is associated with a first key that corresponds to at least one subset of feature points in the corresponding fingerprint image, wherein said first key characterizes the corresponding fingerprint image in the vicinity of said at least one subset of feature points, wherein said first key is based upon at least one of ridge count data which represents a ridge count between pairs of feature points in said at least one subset of feature points in the corresponding fingerprint image, distance data which represents distance between pairs of feature points in said at least one subset of feature points in the corresponding fingerprint image, and ridge angle data which represents local direction of a ridge associated with feature points in said at least one subset of feature points in the corresponding fingerprint image, a program storage device readable by a machine, tangibly embodying a program of instructions executable by the machine to perform method steps for determining similarity between a query fingerprint image and said plurality of fingerprint images stored in said database, the method steps comprising:

identifying a plurality of feature points in said query fingerprint image, wherein said feature points are derived from singularities in ridge patterns in said query fingerprint image;

grouping said plurality of feature points in said query fingerprint image into a first plurality of subsets, wherein each subset is associated with a predetermined number K of feature points, wherein K is an integer in the range K>3;

for at least one subset of said first plurality of subsets of feature points in said query fingerprint image, generating a second key that corresponds to said at least one subset of feature points in said query fingerprint image, wherein said second key characterizes said query fingerprint image in the vicinity of said at least one subset of feature points in said query fingerprint image, wherein said second key is based upon at least one of:

ridge count data which represents a ridge count between pairs of feature points in said at least one subset of feature points in said query fingerprint image, distance data which represents distance between pairs of feature points in said at least one subset of feature points in said query fingerprint image, and ridge angle data which represents local direction of a ridge associated with feature points in said at least one subset of feature points in said query fingerprint image, retrieving from said memory entries that are associated with a first key that corresponds to said second key, and for at least one entry retrieved from said memory, generating data that represents a match hypothesis associated with said query fingerprint image and a fingerprint image stored in said database that corresponds to said at least one entry retrieved from said memory, wherein said data comprises an identifier that identifies said fingerprint image stored in said database that corresponds to said at least one entry retrieved from said memory, determining a score associated with said data, and storing said data and score as an entry in a vote table.

35. The program storage device of claim 34, further comprising the step of:

selecting one or more entries of said vote table based upon said score associated with said entries; and identifying at least one fingerprint image that corresponds to the selected entries of said vote table as a potential matching fingerprint image to said query fingerprint image.

36. The program storage device of claim 34, wherein said data that represents said match hypothesis comprises parameters of at least one transformation matrix.

37. The program storage device of claim 36, wherein said at least one transformation matrix represents one of rotation, translation and scaling between location of said at least one subset of feature points in said query fingerprint image and location of a subset of feature points that correspond to said at least one entry retrieved from said memory.

38. The program storage device of claim 34, wherein said singularities comprise one of a ridge ending and a ridge bifurcation.

39. The program storage device of claim 34, wherein the key generation step and the entry retrieving step are performed for each subset of a second plurality of subsets of feature points, wherein said second plurality of subsets is less than said first plurality of subsets.

40. The program storage device of claim 39, wherein said second plurality of subsets is formed by filtering said first plurality of subsets.

41. The program storage device of claim 40, wherein said first plurality of subsets are filtered based upon distance between pairs of feature points in said first plurality of subsets.

42. The program storage device of claim 41, wherein said filtering of said first plurality of subsets includes the following steps applied to each given subset of said first plurality of subsets:

determining if the distance between each pair of feature points in the given subset is within a predetermined range;

if it is determined that the distance between each pair of feature points in the given subset is within said predetermined range, then including said given subset in said second plurality of subsets; and if it is determined that the distance between each pair of feature points in the given subset is not within said predetermined range, then excluding said given subset from said second plurality of subsets.

43. The program storage device of claim 40, wherein said first plurality of subsets are filtered based upon data values associated with said first plurality of subsets, wherein said data value associated with a given subset is based upon a function of at least one invariant parameter associated with said feature points of said given subset.

44. The program storage device of claim 43, wherein said invariant parameter represents a distance between pairs of feature points of said given subset.

45. The program storage device of claim 44, wherein said data value associated with a given subset includes a first portion and a second portion, wherein said first portion is based upon a maximum distance between pairs of feature points of said given subset, and wherein said second portion is based upon a minimum distance between pairs of feature points of said given subset.

46. The program storage device of claim 43, wherein said filtering of said first plurality of subsets includes the steps of:

identifying a given data value for which a number N of subsets associated with a data value less than or equal to said given data value is greater than a predetermined limit Nmax;

removing from said first plurality of subsets those subsets associated with a data value greater than or equal to said given data value.

* * * * *

UNITED STATES PATENT AND TRADEMARK OFFICE
CERTIFICATE OF CORRECTION

PATENT NO.    : 6,041,133
DATED         : March 21, 2000
INVENTOR(S)   : Andrea Califano, Scott Eric Colville and Robert steven Germain It is certified that error appears in the above-identified patent and that said Letters Patent is hereby corrected as shown below:

In the Claims

Column 12,
Line 29, please change "K>3" to -- K$\geq$3 --;

Column 13,
Line 47, please change K>3" to -- K$\geq$3 --;

Column 15,
Line 20, please change "K>3" to -- K$\geq$3 --;

Column 17,
Line 22, please change "K>3" to -- K$\geq$3 --.

Signed and Sealed this

Thirty-first Day of July, 2001

Attest:

*Attesting Officer*

NICHOLAS P. GODICI
*Acting Director of the United States Patent and Trademark Office*